United States Patent
Sethuraman

(10) Patent No.: US 12,518,614 B2
(45) Date of Patent: Jan. 6, 2026

(54) BUILDING MANAGEMENT SYSTEM WITH INTER-PANEL COMMUNICATION AS A SECONDARY COMMUNICATION PATHWAY FOR AIDING IN REPORTING ALARMS TO A REMOTE OR CLOUD DEVICE

(71) Applicant: Honeywell International Inc., Charlotte, NC (US)

(72) Inventor: Raja Sethuraman, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 62 days.

(21) Appl. No.: 18/645,024

(22) Filed: Apr. 24, 2024

(65) Prior Publication Data

US 2025/0336283 A1  Oct. 30, 2025

(51) Int. Cl.
G08B 25/00 (2006.01)
G08B 29/00 (2006.01)

(52) U.S. Cl.
CPC ........... *G08B 25/008* (2013.01); *G08B 29/00* (2013.01)

(58) Field of Classification Search
CPC ........ G03F 7/039; G03F 7/0035; G03F 7/161; G03F 7/168; G03F 7/0233; G03F 7/40;
(Continued)

(56) References Cited

U.S. PATENT DOCUMENTS 6,360,330 B1 * 3/2002 Mutalik .............. G06F 11/1466
707/999.003

7,330,997 B1 * 2/2008 Odom ................. G06F 11/1464
714/6.23
(Continued)

FOREIGN PATENT DOCUMENTS

| CN | 105894757 A | 8/2016 |
|---|---|---|
| CN | 111865709 B | 9/2022 |
| CN | 116112303 A | 5/2023 |

OTHER PUBLICATIONS

Zhang et al., "A Distributed Algorithm for Sensor Fault Detection", 2018 IEEE International Conference on Automation Science and Engineering (CASE) Munich, Germany, Aug. 20-24, 2018. The Technology Library, pp. 756-761, 6 pages, Downloaded Oct. 23, 2023.
(Continued)

*Primary Examiner* — Curtis J King
(74) *Attorney, Agent, or Firm* — Seager, Tufte & Wickhem, LLP

(57) ABSTRACT

An alarm may be raised by a first control panel at a local site. A current operational status of a remote communication path assigned to the first control panel is determined. When the current operational status of the remote communication path assigned to the first control panel is determined to be on-line, the alarm is sent to a remote cloud server via the remote communication path assigned the first control panel. When the current operational status of the remote communication path assigned to the first control panel is determined to be off-line, the alarm is sent to a second control panel at the local site via one or more local communication paths. The second control panel then sends the first alarm to the remote cloud server via a remote communication path that is assigned the second control panel.

20 Claims, 6 Drawing Sheets

(58) Field of Classification Search
CPC .............. C08G 73/106; C08G 73/1042; C08G 73/1046; C08G 73/1075; C09D 179/08
See application file for complete search history.

(56) References Cited

U.S. PATENT DOCUMENTS

| | | | | |
|---|---|---|---|---|
| 7,340,314 | B1* | 3/2008 | Duncan | G06F 21/81 |
| | | | | 709/224 |
| 7,383,327 | B1* | 6/2008 | Tormasov | H04L 41/22 |
| | | | | 718/1 |
| 9,467,476 | B1* | 10/2016 | Shieh | G06F 21/554 |
| 9,905,119 | B2* | 2/2018 | Pettigrew | G08B 29/02 |
| 10,249,174 | B2* | 4/2019 | El-Mankabady | G06F 40/40 |
| 10,679,491 | B1* | 6/2020 | Nalukurthy | G08B 29/22 |
| 10,713,127 | B2 | 7/2020 | Ramakrishnappa et al. | |
| 10,813,200 | B2 | 10/2020 | Klecha et al. | |
| 10,937,302 | B2* | 3/2021 | Sahai | G08B 29/043 |
| 2006/0055796 | A1* | 3/2006 | Matsui | H04N 1/32683 |
| | | | | 348/231.2 |
| 2006/0132303 | A1 | 6/2006 | Stilp | |
| 2010/0238018 | A1* | 9/2010 | Kelly | G08B 25/08 |
| | | | | 340/517 |
| 2011/0219114 | A1* | 9/2011 | Yang | H04L 61/4535 |
| | | | | 709/224 |
| 2014/0047080 | A1* | 2/2014 | Piccolo, III | H04L 61/2503 |
| | | | | 709/220 |
| 2014/0240105 | A1 | 8/2014 | Brenner | |
| 2014/0333430 | A1* | 11/2014 | Piccolo, III | G08B 29/16 |
| | | | | 340/508 |
| 2015/0286435 | A1* | 10/2015 | Hwang | G06F 11/1458 |
| | | | | 711/162 |
| 2016/0092593 | A1* | 3/2016 | Peacock | G06F 16/182 |
| | | | | 707/796 |
| 2016/0285673 | A1* | 9/2016 | Ho | H04L 69/40 |
| 2017/0201498 | A1* | 7/2017 | Baig | G06F 21/6254 |
| 2017/0220425 | A1* | 8/2017 | Anders | H04L 67/1097 |
| 2018/0359220 | A1 | 12/2018 | Trivelpiece et al. | |
| 2019/0028270 | A1* | 1/2019 | Foisy | H04L 67/12 |
| 2019/0036763 | A1* | 1/2019 | Sauer | H04N 21/23106 |
| 2020/0193401 | A1* | 6/2020 | Vedula | G06Q 20/202 |
| 2020/0226894 | A1* | 7/2020 | Krishnamoorthy | G08B 3/10 |
| 2021/0299502 | A1* | 9/2021 | Sorotskyi | A62C 37/50 |
| 2022/0269768 | A1* | 8/2022 | Werner | H04N 23/61 |
| 2022/0270453 | A1* | 8/2022 | Werner | G08B 13/04 |
| 2023/0152868 | A1* | 5/2023 | Hu | G06F 11/1458 |
| | | | | 713/1 |
| 2024/0203233 | A1* | 6/2024 | R | G08B 21/0261 |
| 2025/0225861 | A1* | 7/2025 | Barrieau | G08B 17/00 |
| 2025/0239150 | A1* | 7/2025 | Ganesan | G08B 25/009 |

OTHER PUBLICATIONS

Extended European Search Report, EP Application No. 25169558.1, European Patent Office, Sep. 5, 2025 (12 pgs).

* cited by examiner

```
                                46
                                 ↘
┌─────────────────────────────────────────────────────────────────────────────┐ ⎤48
│ RAISE A FIRST ALARM BASED AT LEAST IN PART ON THE BUILDING MANAGEMENT       │
│ INFORMATION RECEIVED VIA THE THIRD PORT                                     │
└─────────────────────────────────────────────────────────────────────────────┘
                                    ↓
┌─────────────────────────────────────────────────────────────────────────────┐ ⎤50
│ DETERMINE WHETHER THE FIRST ALARM IS OF A FIRST ALARM TYPE                  │
└─────────────────────────────────────────────────────────────────────────────┘
                                    ↓
┌─────────────────────────────────────────────────────────────────────────────┐ ⎤52
│ DETERMINE A CURRENT OPERATIONAL STATUS OF THE REMOTE COMMUNICATION PATH     │
│ TO THE REMOTE CLOUD SERVER VIA THE FIRST PORT, WHEREIN THE CURRENT          │
│ OPERATIONAL STATUS INCLUDES OPTIONS OF ON-LINE AND OFF-LINE                 │
└─────────────────────────────────────────────────────────────────────────────┘
                                    ↓
┌─────────────────────────────────────────────────────────────────────────────┐ ⎤54
│ WHEN THE CURRENT OPERATIONAL STATUS OF THE REMOTE COMMUNICATION PATH IS     │
│ DETERMINED TO BE ON-LINE, SEND THE FIRST ALARM VIA THE FIRST PORT TO THE    │
│ REMOTE CLOUD SERVER USING THE REMOTE COMMUNICATION PATH                     │
└─────────────────────────────────────────────────────────────────────────────┘
                                    ↓
┌─────────────────────────────────────────────────────────────────────────────┐ ⎤56
│ WHEN THE CURRENT OPERATIONAL STATUS OF THE REMOTE COMMUNICATION PATH IS     │
│ DETERMINED TO BE OFF-LINE, AND THE FIRST ALARM IS OF THE FIRST ALARM TYPE,  │
│ SEND THE FIRST ALARM TO THE SECOND CONTROL PANEL OF THE BUILDING            │
│ MANAGEMENT SYSTEM VIA THE SECOND PORT FOR SUBSEQUENT TRANSMISSION BY THE    │
│ SECOND CONTROL PANEL TO THE REMOTE CLOUD SERVER VIA A REMOTE COMMUNICATION  │
│ PATH ASSOCIATED WITH THE SECOND CONTROL PANEL OF THE BUILDING MANAGEMENT    │
│ SYSTEM                                                                      │
└─────────────────────────────────────────────────────────────────────────────┘
                                    ↓
┌─────────────────────────────────────────────────────────────────────────────┐ ⎤58
│ RAISE A SECOND ALARM BASED AT LEAST IN PART ON THE BUILDING MANAGEMENT      │
│ INFORMATION RECEIVED VIA THE THIRD PORT, WHEREIN THE SECOND ALARM IS OF A   │
│ SECOND ALARM TYPE                                                           │
└─────────────────────────────────────────────────────────────────────────────┘
                                    ↓
┌─────────────────────────────────────────────────────────────────────────────┐ ⎤60
│ WHEN THE CURRENT OPERATIONAL STATUS OF THE REMOTE COMMUNICATION PATH IS     │
│ DETERMINED TO BE ON-LINE, SEND THE SECOND ALARM VIA THE FIRST PORT TO THE   │
│ REMOTE CLOUD SERVER USING THE REMOTE COMMUNICATION PATH                     │
└─────────────────────────────────────────────────────────────────────────────┘
                                    ↓
┌─────────────────────────────────────────────────────────────────────────────┐ ⎤62
│ WHEN THE CURRENT OPERATIONAL STATUS OF THE REMOTE COMMUNICATION PATH IS     │
│ DETERMINED TO BE OFF-LINE, WAIT TO SEND THE SECOND ALARM HAVING THE SECOND  │
│ ALARM TYPE UNTIL AFTER THE CURRENT OPERATIONAL STATUS OF THE REMOTE         │
│ COMMUNICATION PATH IS DETERMINED TO BE BACK ON-LINE, AND THEN SEND THE      │
│ SECOND ALARM VIA THE FIRST PORT TO THE REMOTE CLOUD SERVER USING THE        │
│ REMOTE COMMUNICATION PATH                                                   │
└─────────────────────────────────────────────────────────────────────────────┘
```

FROM FIG. 4A

82 — WHEN THE CURRENT OPERATIONAL STATUS OF THE REMOTE COMMUNICATION PATH THAT IS ASSIGNED TO THE SECOND ONE OF THE PLURALITY OF CONTROL PANELS IS DETERMINED TO BE OFF-LINE AND THE CURRENT OPERATIONAL STATUS OF THE REMOTE COMMUNICATION PATH THAT IS ASSIGNED TO THE THIRD ONE OF THE PLURALITY OF CONTROL PANELS IS DETERMINED TO BE ON-LINE, SENDING THE FIRST ALARM RAISED BY THE FIRST ONE OF THE PLURALITY OF CONTROL PANELS TO THE THIRD ONE OF THE PLURALITY OF CONTROL PANELS VIA ONE OR MORE OF THE LOCAL COMMUNICATION PATHS AT THE LOCAL SITE

84 — AFTER RECEIVING THE FIRST ALARM, THE THIRD ONE OF THE PLURALITY OF CONTROL PANELS SENDING THE FIRST ALARM FROM THE THIRD ONE OF THE PLURALITY OF CONTROL PANELS TO THE REMOTE CLOUD SERVER VIA THE REMOTE COMMUNICATION PATH THAT IS ASSIGNED THE THIRD ONE OF THE PLURALITY OF CONTROL PANELS

86 — WHEN THE FIRST ALARM IS OF A FIRST ALARM TYPE:

- 86a — RAISING A SECOND ALARM BY THE FIRST ONE OF THE PLURALITY OF CONTROL PANELS, WHEREIN THE SECOND ALARM HAS A SECOND ALARM TYPE, WHEREIN ALARMS OF THE SECOND ALARM TYPE HAVE A LOWER PRIORITY THAN ALARMS OF THE FIRST ALARM TYPE

- 86b — WAITING FOR THE CURRENT OPERATIONAL STATUS OF THE REMOTE COMMUNICATION PATH THAT IS ASSIGNED TO THE FIRST ONE OF THE PLURALITY OF CONTROL PANELS TO RETURN TO ON-LINE

- 86c — SENDING THE SECOND ALARM TO THE REMOTE CLOUD SERVER VIA THE REMOTE COMMUNICATION PATH THAT IS ASSIGNED THE FIRST ONE OF THE PLURALITY OF CONTROL PANELS AFTER THE CURRENT OPERATIONAL STATUS OF THE REMOTE COMMUNICATION PATH THAT IS ASSIGNED THE FIRST ONE OF THE PLURALITY OF CONTROL PANELS RETURNS TO ON-LINE

88 — WHEN THE CURRENT OPERATIONAL STATUS OF THE REMOTE COMMUNICATION PATH THAT IS ASSIGNED TO THE FIRST ONE OF THE PLURALITY OF CONTROL PANELS IS DETERMINED TO BE ON-LINE, THE FIRST ONE OF THE PLURALITY OF CONTROL PANELS SENDING THE FIRST ALARM FROM THE FIRST ONE OF THE PLURALITY OF CONTROL PANELS TO THE REMOTE CLOUD SERVER VIA THE REMOTE COMMUNICATION PATH THAT IS ASSIGNED THE FIRST ONE OF THE PLURALITY OF CONTROL PANELS

FIG. 4B

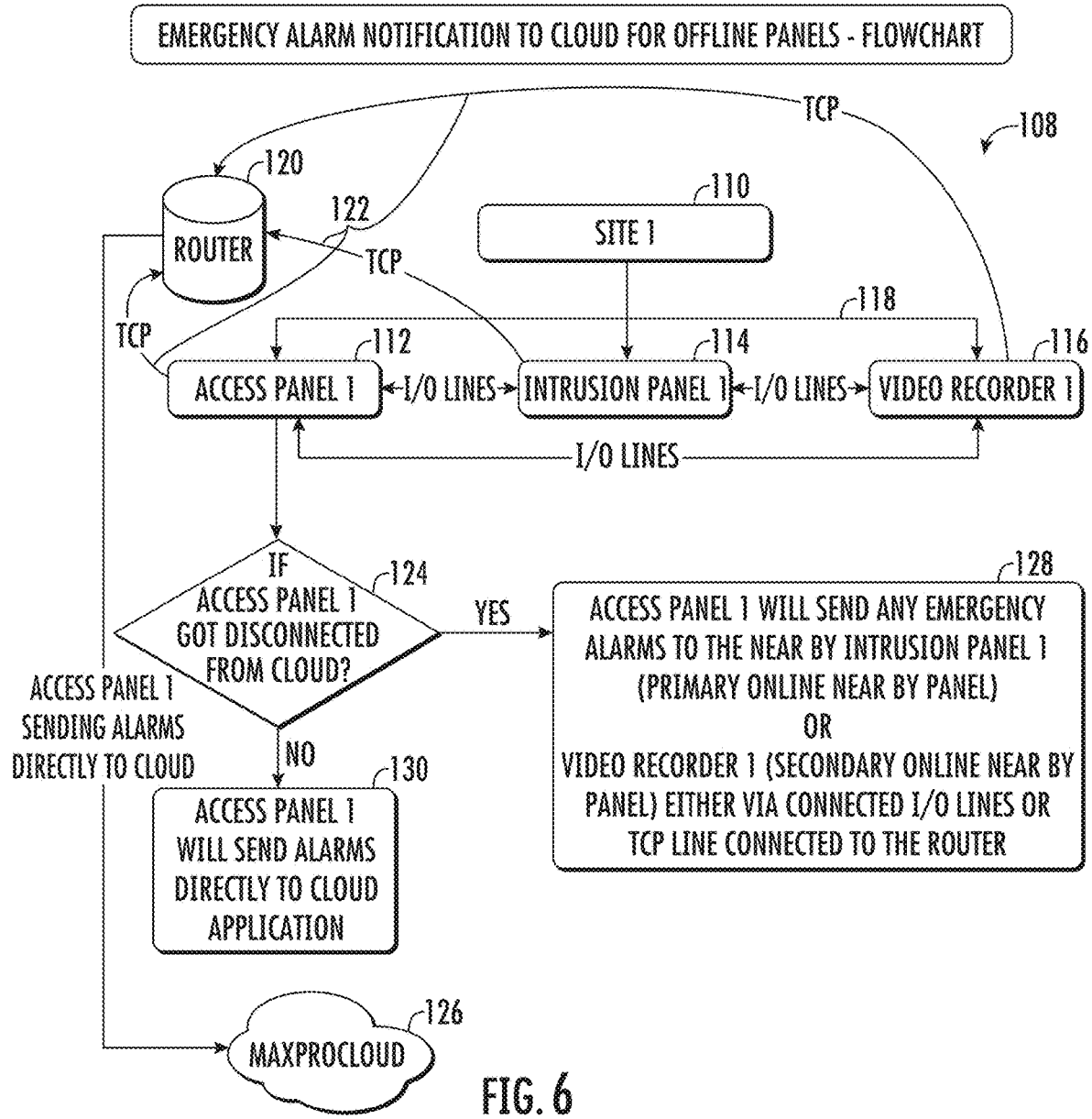

BUILDING MANAGEMENT SYSTEM WITH INTER-PANEL COMMUNICATION AS A SECONDARY COMMUNICATION PATHWAY FOR AIDING IN REPORTING ALARMS TO A REMOTE OR CLOUD DEVICE

TECHNICAL FIELD

The present disclosure relates generally to building management systems and more particularly to method and systems for improving communications reliability in reporting alarms from local control panels to remote or cloud devices.

BACKGROUND

Building management systems frequently include local or edge devices such as control panels as well as remote or cloud devices such as central monitoring stations. The control panels may include, for example, access control panels, intrusion detection control panels, fire detection control panels, video management control panels, HVAC control panels, among others. If one of the control panels loses communication with the remote or cloud devices, alerts and/or alarms issued by the local control panels may not be promptly reported to the remote or cloud devices. This can mean that a fire alarm, a door alarm or a panic alarm, for example, may not be promptly reported to a remote or cloud device such as a central monitoring station. What would be desirable are method and systems for improving communications reliability for reporting alarms from local control panels to remote or cloud devices.

SUMMARY

The present disclosure relates generally to building management systems and more particularly to method and systems for improving communications reliability in reporting alarms from local control panels to remote or cloud devices. In some instances, this includes providing a building management system with inter-panel communication as a secondary communication pathway for aiding in reporting alarms to a remote or cloud device.

An example may be found in a method for communicating alarms of a building management system from a local site to a remote cloud server, wherein the building management system includes a plurality of control panels that are each coupled to at least one other of the plurality of control panels via one or more local communication paths at the local site, and wherein each of the plurality of control panels is assigned a different remote communication path for communicating with the remote cloud server. The illustrative method includes raising a first alarm by a first one of the plurality of control panels and determining a current operational status of the remote communication path that is assigned to the first one of the plurality of control panels, wherein the current operational status includes options of on-line and off-line. When the current operational status of the remote communication path that is assigned to the first one of the plurality of control panels is determined to be off-line, the method includes sending the first alarm raised by the first one of the plurality of control panels to a second one of the plurality of control panels via one or more of the local communication paths at the local site. After receiving the first alarm, the method includes the second one of the plurality of control panels sending the first alarm from the second one of the plurality of control panels to the remote cloud server via the remote communication path that is assigned the second one of the plurality of control panels.

Another example may be found in a control panel of a building management system. The control panel includes a first port for communicating with a remote cloud server via a remote communication path, a second port for communicating with a second control panel of the building management system via a local communication path, and a third port for receiving building management information. A controller is operatively coupled to the first port, the second port and the third port, and is configured to raise a first alarm based at least in part on the building management information received via the third port, to determine whether the first alarm is of a first alarm type, and to determine a current operational status of the remote communication path to the remote cloud server via the first port, wherein the current operational status includes options of on-line and off-line. When the current operational status of the remote communication path is determined to be on-line, the controller is configured to send the first alarm via the first port to the remote cloud server using the remote communication path. When the current operational status of the remote communication path is determined to be off-line, and the first alarm is of the first alarm type, the controller is configured to send the first alarm to the second control panel of the building management system via the second port for subsequent transmission by the second control panel to the remote cloud server via a remote communication path associated with the second control panel of the building management system.

Another example may be found in a non-transitory computer readable medium storing instructions that when executed by one or more processors of a first control panel cause the one or more processors to receive building management information and to raise a first alarm based at least in part on the received building management information. The one or more processors are caused to determine a current operational status of a remote communication path to a remote cloud server, wherein the current operational status includes options of on-line and off-line. When the current operational status of the remote communication path is determined to be on-line, the one or more processors are caused to send the first alarm to the remote cloud server via the remote communication path. When the current operational status of the remote communication path is determined to be off-line, the one or more processors are caused to send the first alarm to a second control panel for subsequent transmission by the second control panel to the remote cloud server via a remote communication path associated with the second control panel.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 3 is a flow diagram showing an illustrative series of steps that a controller forming part of the illustrative control panel of FIG. 2 may be configured to carry out;

FIGS. 4A and 4B are flow diagrams that together show an illustrative method for communicating alarms of a building management system;

FIG. 6 is a flow diagram showing an illustrative method.

Figure 1:
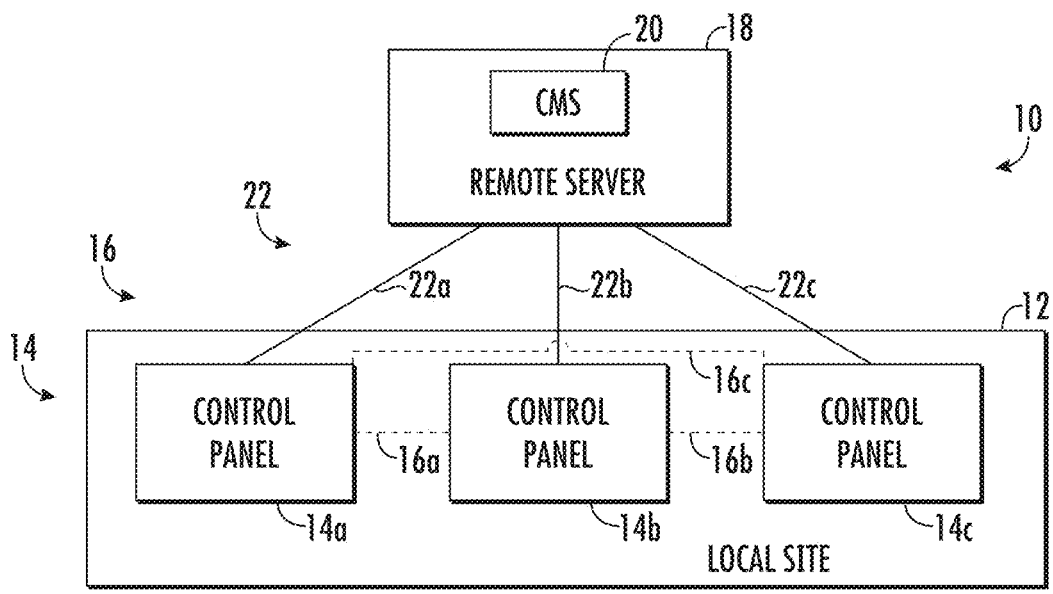
FIG. 1 is a schematic block diagram showing an illustrative building management system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative building management system 10. The building management system 10 includes a local site 12 that may include a number of different systems such as an access system, an intrusion detection system, a fire detection system, a video management system, an HVAC system, and/or others. Each of these systems may include a control panel 14, individually labeled as 14a, 14b and 14c. While a total of three control panels 14 are shown, it will be appreciated that the local site 12 may include any number of control panels 14, depending on how many individual systems are included within the building management system 10. In some cases, each of the individual systems may include two or more control panels, such as one for each zone in a building.

Each of the control panels 14 are able to communicate locally with the other control panels 14 via a local communication path 16, individually labeled as 16a, 16b and 16c. For example, the control panel 14a and the control panel 14b are able to communicate with each other via the local communication path 16a. The control panel 14b and the control panel 14c are able to communicate with each other via the local communication path 16b. The control panel 14a and the control panel 14c are able to communicate with each other via the local communication path 16c. In some cases, the local communication paths 16 may include a bus such as a serial bus. In some cases, the local communication paths 16 may additionally or alternatively include an ethernet communication path. In some cases, the local communication paths 16 may include wireless communications paths, such as communication paths of a wireless mesh network. These are just examples.

The illustrative building management system 10 also includes a remote server 18. In some cases, the remote server 18 may be a cloud-based server. In some cases, the remote server 18 may provide a central monitoring station (CMS) 20. Each of the control panels 14 may communicate with the remote server 18 (and hence with the CMS 20) via a corresponding remote communication path 22. In the example shown, the control panel 14a communicates with the remote server 18 (and hence with the CMS 20) via the remote communication path 22a. The control panel 14b communicates with the remote server 18 (and hence with the CMS 20) via the remote communication path 22b. The control panel 14c communications with the remote server 18 (and hence with the CMS 20) via the remote communication path 22c. In some cases, the remote communication paths 22 may include the Internet, for example.

Figure 2:
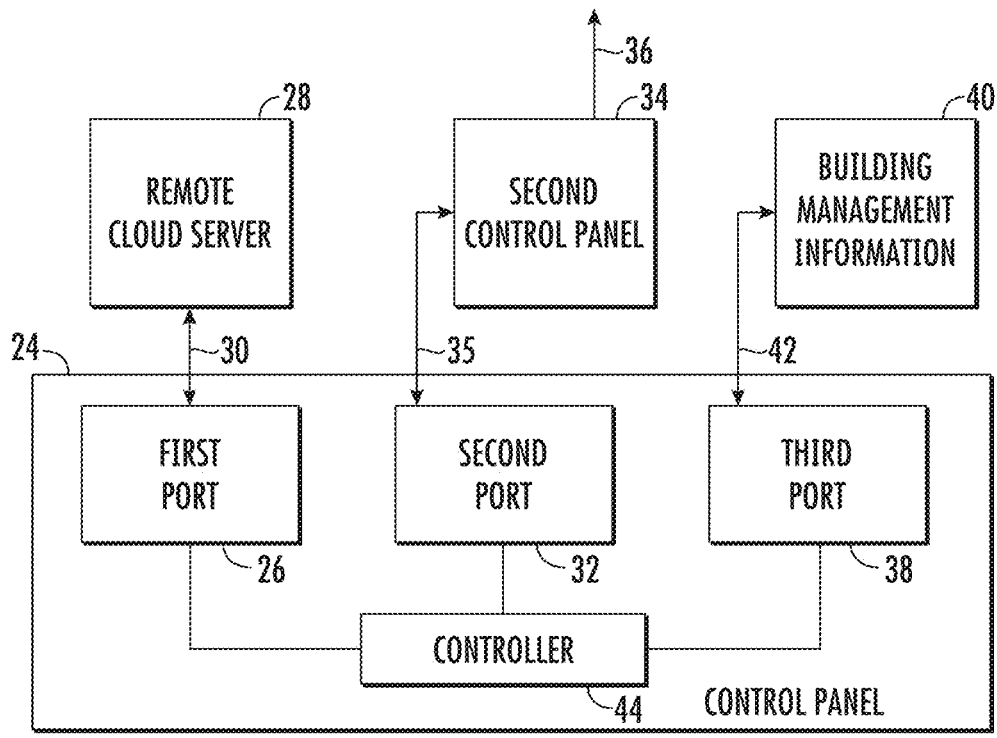
FIG. 2 is a schematic block diagram showing an illustrative control panel forming part of the illustrative building management system of FIG. 1.

FIG. 2 is a schematic block diagram of an illustrative control panel 24. The control panel 24 may be considered as representing any of the control panels 14 shown in FIG. 1. The control panel 24 may be, for example, one of an access control panel, an intrusion control panel, a video recorder control panel, a fire control panel and an HVAC control panel. The illustrative control panel 24 includes a first port 26 for communicating with a remote cloud server 28 via a corresponding remote communication path 30. In some cases, the remote communication path 30 may include the Internet. The remote cloud server 28 may be considered as an example of the remote server 18. The control panel 24 includes a second port 32 for communicating with a second control panel 34 of the building management system 10 via a local communication path 35. The local communication path 35 may include a bus such as a serial bus. The local communication path 35 may include an ethernet communication path. The local communication path 35 may include a wireless communications paths, such as a communication path of a wireless mesh network. These are just examples. The control panel 24 includes a third port 38 for receiving building management information 40 over a communication path 42. A controller 44 is operatively coupled to the first port 26, the second port 32 and the third port 38.

FIG. 3 is a flow diagram showing an illustrative series of steps 46 that the controller 44 of FIG. 2 may be configured to carry out. The controller 44 may be configured to raise a first alarm based at least in part on the building management information 40 that was received via the third port 38, as indicated at block 48. The controller 44 may be configured to determine whether the first alarm is of a first alarm type, as indicated at block 50. The controller 44 may be configured to determine a current operational status of the remote communication path 30 to the remote cloud server 28 via the first port 26, wherein the current operational status includes options of on-line and off-line, as indicated at block 52. When the current operational status of the remote communication path 30 is determined to be on-line, the controller 44 is configured to send the first alarm via the first port 26 to the remote cloud server 28 using the remote communication path 30, as indicated at block 54. When the current operational status of the remote communication path 30 is determined to be off-line, and the first alarm is of the first alarm type, the controller 44 is configured to send the first alarm to the second control panel 34 of the building management system via the second port 32 for subsequent transmission by the second control panel 34 to the remote cloud server 28 via a remote communication path 36 that is associated with the second control panel 34 of the building management system, as indicated at block 56.

In some cases, the controller 44 may be configured to raise a second alarm based at least in part on the building management information 40 that was received via the third port 38, wherein the second alarm is of a second alarm type, as indicated at block 58. When the current operational status of the remote communication path 30 is determined to be on-line, the controller 44 is configured to send the second alarm via the first port 26 to the remote cloud server 28 using the remote communication path 30, as indicated at block 60. When the current operational status of the remote communication path 30 is determined to be off-line, the controller 44 is configured to wait to send the second alarm having the second alarm type until after the current operational status of the remote communication path 30 is determined to be back on-line, and then send the second alarm via the first port 26 to the remote cloud server 28 using the remote communication path 30, as indicated at block 62. In some case, alarms of the first alarm type are classified as critical or high priority alarms, while alarms of the second alarm type are classified as non-critical or low priority alarms.

Figure 4A:
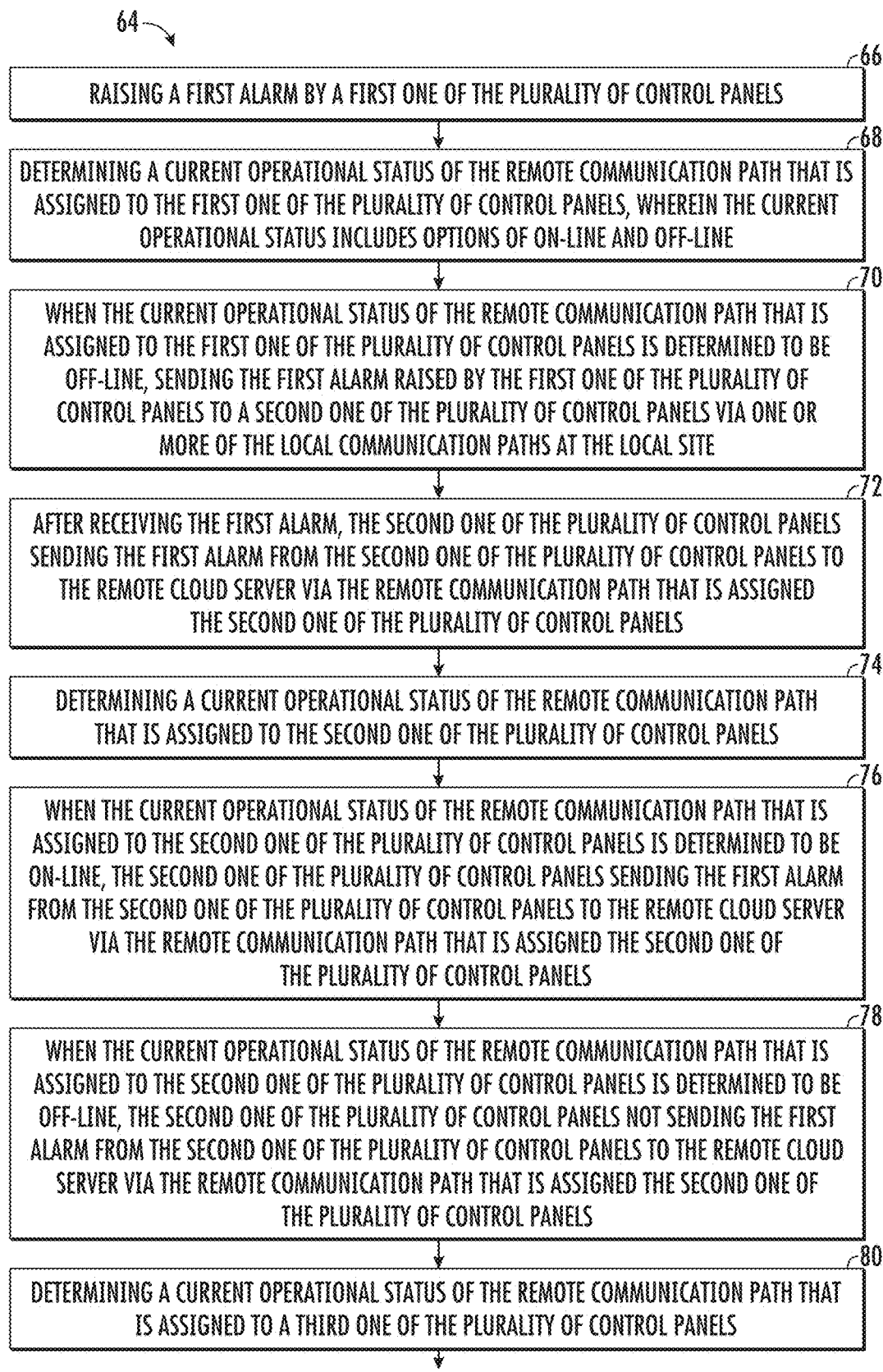

FIGS. 4A and 4B are flow diagrams that together show an illustrative method 64 for communicating alarms of a building management system (such as the building management system 10) from a local site (such as the local site 12) to a remote cloud server (such as the remote server 18), wherein the building management system includes a plurality of control panels (such as the control panels 14) that are each coupled to at least one other of the plurality of control panels via one or more local communication paths (such as the local communication paths 16 at the local site), and wherein each of the plurality of control panels is assigned a different remote communication path (such as the remote communication paths 22) for communicating with the remote cloud server 18. In some cases, the plurality of control panels may include two or more of an access control panel, an intrusion control panel, a video recorder control panel, a fire control panel and an HVAC control panel. In some cases, the plurality of control panels may include two or more access control panels, two or more intrusion control panels, two or more video recorder control panels, two or more fire control panels, two or more HVAC control panels, or a mixture of access control panels, intrusion control panels, video recorder control panels, fire control panels and/or HVAC control panels.

As an example, the first one of the plurality of control panels may be one of an access control panel, an intrusion control panel, a video recorder control panel and a fire control panel, and the second one of the plurality of control panels may be a different one of the access control panel, the intrusion control panel, the video recorder control panel and the fire control panel. The one or more local communication paths may include a bus such as a serial bus. In some cases, the one or more local communication paths may include an ethernet communication path. In some cases, the one or more local communication paths may include a wireless communications path, such as a communication path of a wireless mesh network. These are just examples. The remote communication path that is assigned to the first one of the plurality of control panels may include the Internet, a cellular communication path, a satellite communication path and/or any other suitable communication path.

The illustrative method 64 includes raising a first alarm by a first one of the plurality of control panels, as indicated at block 66. A current operational status of the remote communication path that is assigned to the first one of the plurality of control panels is determined, wherein the current operational status includes options of on-line and off-line, as indicated at block 68. A remote communication path may become off-line when the first port, a network switch, a network router, a firewall and/or other device supporting the assigned remote communication path fails to function properly. This may be cause by a hardware failure or a software issue (e.g. a firmware issue, loss network configuration settings, etc.). In some cases, the remote communication path may still be functioning but may be considered off-line when the Signal-to-Noise ratio (SNR) falls below a threshold SNR value, or when the throughput of the remote communication path falls below a threshold throughput. These are just examples.

When the current operational status of the remote communication path that is assigned to the first one of the plurality of control panels is determined to be off-line, the first alarm raised by the first one of the plurality of control panels is sent to a second one of the plurality of control panels via one or more of the local communication paths at the local site, as indicated at block 70. After receiving the first alarm, the second one of the plurality of control panels sends the first alarm from the second one of the plurality of control panels to the remote cloud server via the remote communication path that is assigned the second one of the plurality of control panels, as indicated at block 72.

In some cases, the method 64 may include determining a current operational status of the remote communication path that is assigned to the second one of the plurality of control panels, as indicated at block 74. When the current operational status of the remote communication path that is assigned to the second one of the plurality of control panels is determined to be on-line, the second one of the plurality of control panels sends the first alarm from the second one of the plurality of control panels to the remote cloud server via the remote communication path that is assigned the second one of the plurality of control panels, as indicated at block 76. When the current operational status of the remote communication path that is assigned to the second one of the plurality of control panels is determined to be off-line, the second one of the plurality of control panels does not send the first alarm from the second one of the plurality of control panels to the remote cloud server via the remote communication path that is assigned the second one of the plurality of control panels, as indicated at block 78.

When the current operational status of the remote communication path that is assigned to the second one of the plurality of control panels is determined to be off-line and the current operational status of the remote communication path that is assigned to a third one of the plurality of control panels is determined to be on-line, as shown at 80, the first alarm raised by the first one of the plurality of control panels is sent to the third one of the plurality of control panels via one or more of the local communication paths at the local site, as indicated at block 82 (see FIG. 4B). After receiving the first alarm, the third one of the plurality of control panels sends the first alarm from the third one of the plurality of control panels to the remote cloud server via the remote communication path that is assigned the third one of the plurality of control panels, as indicated at block 84.

In some cases, the first alarm may be of a first alarm type, as indicated at block 86. The method 64 may include raising a second alarm by the first one of the plurality of control panels, wherein the second alarm has a second alarm type, wherein alarms of the second alarm type have a lower priority than alarms of the first alarm type, as indicated at block 86a. The method 64 may include waiting for the current operational status of the remote communication path that is assigned to the first one of the plurality of control panels to return to on-line, as indicated at block 86b, before sending the second alarm to the remote cloud server via the remote communication path that is assigned the first one of the plurality of control panels, as indicated at block 86c. In some cases, when the current operational status of the remote communication path that is assigned to the first one of the plurality of control panels returns to have an on-line status, the first one of the plurality of control panels may send subsequent alarm having the first alarm type and alarms having the second alarm type to the remote cloud server via the remote communication path that is assigned the first one of the plurality of control panels, as indicated at block 88.

Figure 5:
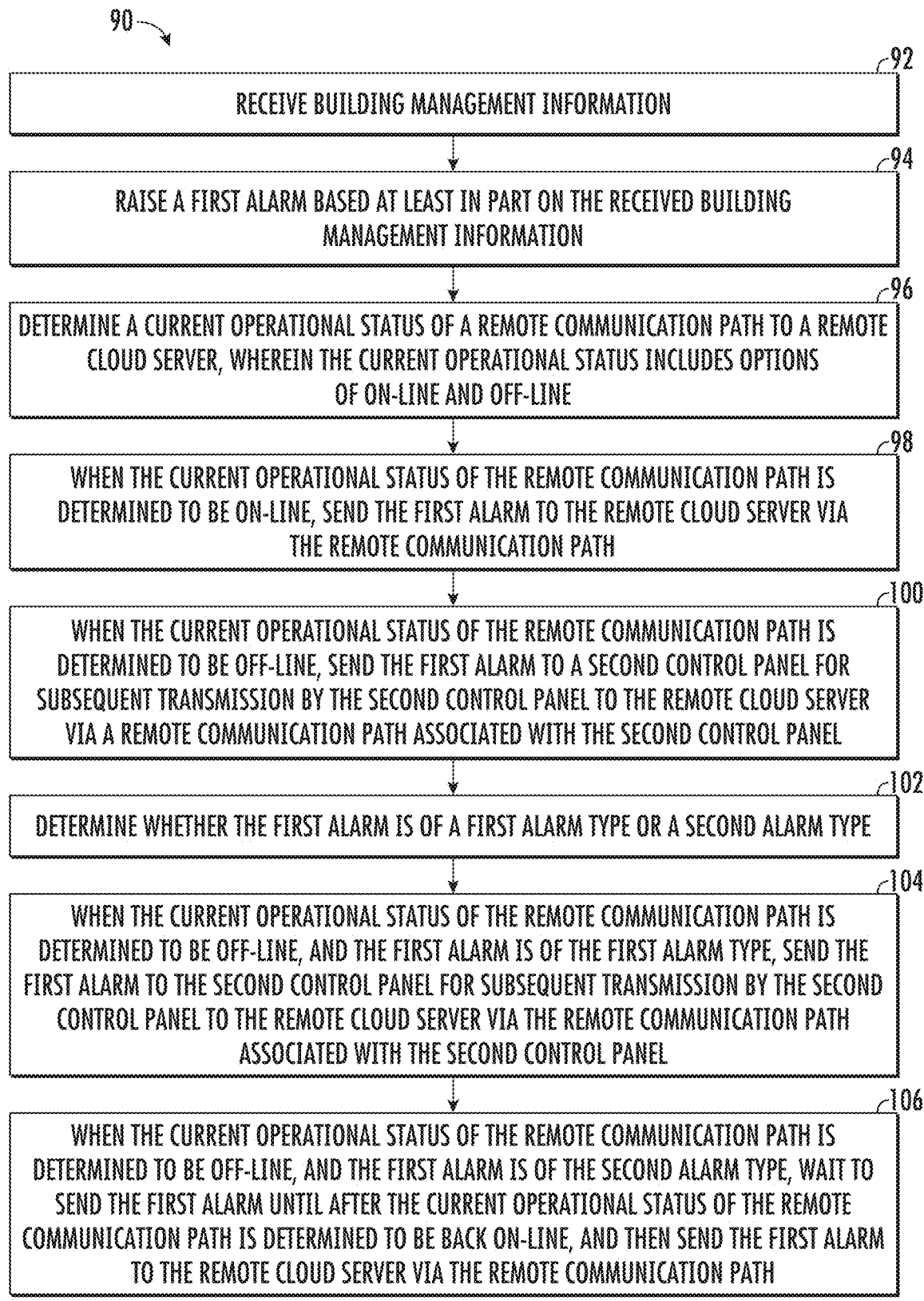
FIG. 5 is a flow diagram showing an illustrative series of steps that may be carried out by one or more processors executing executable instructions that are stored on a non-transient, computer readable storage medium.

FIG. 5 is a flow diagram showing an illustrative series of steps 90 that one or more processors executing executable instructions that are stored on a non-transient, computer readable storage medium may be caused to perform. The one or more processors may be caused to receive building management information, as indicated at block 92. The one or more processors may be caused to raise a first alarm based at least in part on the received building management information, as indicated at block 94. The one or more processors may be caused to determine a current operational status of a remote communication path to a remote cloud server, wherein the current operational status includes options of on-line and off-line, as indicated at block 96. When the current operational status of the remote communication path is determined to be on-line, the first alarm is sent to the remote cloud server via the remote communication path, as indicated at block 98. When the current operational status of the remote communication path is determined to be off-line, the first alarm is sent to a second control panel for subsequent transmission by the second control panel to the remote cloud server via a remote communication path associated with the second control panel, as indicated at block 100.

In some cases, the one or more processors may be caused to determine whether the first alarm is of a first alarm type or a second alarm type, as indicated at block 102. When the current operational status of the remote communication path is determined to be off-line, and the first alarm is of the first alarm type, the first alarm is sent to the second control panel for subsequent transmission by the second control panel to the remote cloud server via the remote communication path associated with the second control panel, as indicated at block 104. When the current operational status of the remote communication path is determined to be off-line, and the first alarm is of the second alarm type, the one or more processors are caused to wait to send the first alarm until after the current operational status of the remote communication path is determined to be back on-line, and then send the first alarm to the remote cloud server via the remote communication path, as indicated at block 106.

FIG. 6 is a flow diagram showing an illustrative method 108 for providing emergency alarm notifications to the cloud 126, even when a panel is considered offline by the cloud-based server 126 (e.g. the remote communication path assigned to the panel is "off-line"). A site (e.g. facility) 110 includes an access panel 112, an intrusion panel 114 and a video recorder 116. The site 110 communicates with the access panel 112, the intrusion panel 114 and the video recorder 116 via I/O lines 118. Each of the access panel 112, the intrusion panel 114 and the video recorder 116 can communicate with each of the other of the access panel 112, the intrusion panel 114 and the video recorder 116 via the I/O lines 118. The I/O lines 118 may be considered an example of the local communication paths 16 of FIG. 1. Each of the access panel 112, the intrusion panel 114 and the video recorder 116 can also communicate with the cloud-based server 126 via a router 120 via TCP lines 122.

A determination is made at a decision block 124 as to whether the access panel 112 has lost communication with a cloud 126, and thus is considered "off-line". If so, control passes to block 128, where the access panel 112 will send any alarm notifications to at least one of the intrusion panel 114 and the video recorder 116 so that at least one of the intrusion panel 114 and the video recorder 116 can send the alarm notifications to the cloud 126. However, if the access panel 112 has not lost communication (and thus considered "on-line"), the access panel 112 will send its own alarm notifications directly to the cloud 126 via the router 120.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for communicating alarms of a building management system from a local site to a remote cloud server, wherein the building management system includes a plurality of control panels that are each coupled to at least one other of the plurality of control panels via one or more local communication paths at the local site, and wherein each of the plurality of control panels is assigned a different remote communication path for communicating with the remote cloud server, the method comprising:

raising a first alarm by a first one of the plurality of control panels;

determining a current operational status of the remote communication path that is assigned to the first one of the plurality of control panels, wherein the current operational status includes options of on-line and off-line;

when the current operational status of the remote communication path that is assigned to the first one of the plurality of control panels is determined to be off-line, sending the first alarm raised by the first one of the plurality of control panels to a second one of the plurality of control panels via one or more of the local communication paths at the local site; and after receiving the first alarm, the second one of the plurality of control panels sending the first alarm from the second one of the plurality of control panels to the remote cloud server via the remote communication path that is assigned the second one of the plurality of control panels.

2. The method of claim 1, comprising:
determining a current operational status of the remote communication path that is assigned to the second one of the plurality of control panels;
when the current operational status of the remote communication path that is assigned to the second one of the plurality of control panels is determined to be on-line, the second one of the plurality of control panels sending the first alarm from the second one of the plurality of control panels to the remote cloud server via the remote communication path that is assigned the second one of the plurality of control panels; and
when the current operational status of the remote communication path that is assigned to the second one of the plurality of control panels is determined to be off-line, the second one of the plurality of control panels not sending the first alarm from the second one of the plurality of control panels to the remote cloud server via the remote communication path that is assigned the second one of the plurality of control panels.

3. The method of claim 2, comprising:
determining a current operational status of the remote communication path that is assigned to a third one of the plurality of control panels;
when the current operational status of the remote communication path that is assigned to the second one of the plurality of control panels is determined to be off-line and the current operational status of the remote communication path that is assigned to the third one of the plurality of control panels is determined to be on-line, sending the first alarm raised by the first one of the plurality of control panels to the third one of the plurality of control panels via one or more of the local communication paths at the local site; and
after receiving the first alarm, the third one of the plurality of control panels sending the first alarm from the third one of the plurality of control panels to the remote cloud server via the remote communication path that is assigned the third one of the plurality of control panels.

4. The method of claim 1, wherein the first alarm is of a first alarm type, the method comprising:
raising a second alarm by the first one of the plurality of control panels, wherein the second alarm has a second alarm type, wherein alarms of the second alarm type have a lower priority than alarms of the first alarm type;
waiting for the current operational status of the remote communication path that is assigned to the first one of the plurality of control panels to return to on-line; and
sending the second alarm to the remote cloud server via the remote communication path that is assigned the first one of the plurality of control panels after the current operational status of the remote communication path that is assigned the first one of the plurality of control panels returns to on-line.

5. The method of claim 1, the method comprising:
when the current operational status of the remote communication path that is assigned to the first one of the plurality of control panels is determined to be on-line, the first one of the plurality of control panels sending the first alarm from the first one of the plurality of control panels to the remote cloud server via the remote communication path that is assigned the first one of the plurality of control panels.

6. The method of claim 1, wherein the plurality of control panels includes two or more of an access control panel, an intrusion control panel, a video recorder control panel and a fire control panel.

7. The method of claim 1, wherein the first one of the plurality of control panels is one of an access control panel, an intrusion control panel, a video recorder control panel and a fire control panel, and the second one of the plurality of control panels is a different one of the access control panel, the intrusion control panel, the video recorder control panel and the fire control panel.

8. The method of claim 1, wherein the one or more local communication paths include a bus.

9. The method of claim 8, wherein the bus is a serial bus.

10. The method of claim 1, wherein the one or more local communication paths include an ethernet communication path.

11. The method of claim 1, wherein the remote communication path that is assigned to the first one of the plurality of control panels includes the Internet.

12. A control panel of a building management system, comprising:
a first port for communicating with a remote cloud server via a remote communication path;
a second port for communicating with a second control panel of the building management system via a local communication path;
a third port for receiving building management information;
a controller operatively coupled to the first port, the second port and the third port, the controller configured to:
raise a first alarm based at least in part on the building management information received via the third port;
determine whether the first alarm is of a first alarm type;
determine a current operational status of the remote communication path to the remote cloud server via the first port, wherein the current operational status includes options of on-line and off-line;
when the current operational status of the remote communication path is determined to be on-line, send the first alarm via the first port to the remote cloud server using the remote communication path; and
when the current operational status of the remote communication path is determined to be off-line, and the first alarm is of the first alarm type, send the first alarm to the second control panel of the building management system via the second port for subsequent transmission by the second control panel to the remote cloud server via a remote communication path associated with the second control panel of the building management system.

13. The control panel of claim 12, wherein the controller is configured to:
raise a second alarm based at least in part on the building management information received via the third port, wherein the second alarm is of a second alarm type;
when the current operational status of the remote communication path is determined to be on-line, send the second alarm via the first port to the remote cloud server using the remote communication path; and
when the current operational status of the remote communication path is determined to be off-line, wait to send the second alarm having the second alarm type until after the current operational status of the remote communication path is determined to be back on-line, and then send the second alarm via the first port to the remote cloud server using the remote communication path.

14. The control panel of claim 12, wherein the control panel is one of an access control panel, an intrusion control panel, a video recorder control panel and a fire control panel.

15. The control panel of claim 12, wherein the local communication path includes a bus.

16. The control panel of claim 15, wherein the bus is a serial bus.

17. The control panel of claim 12, wherein the local communication path includes an ethernet communication path.

18. The control panel of claim 12, wherein the remote communication path includes the Internet.

19. A non-transitory computer readable medium storing instructions that when executed by one or more processors of a first control panel cause the one or more processors to:
  receive building management information;
  raise a first alarm based at least in part on the received building management information;
  determine a current operational status of a remote communication path to a remote cloud server, wherein the current operational status includes options of on-line and off-line;
  when the current operational status of the remote communication path is determined to be on-line, send the first alarm to the remote cloud server via the remote communication path; and
  when the current operational status of the remote communication path is determined to be off-line, send the first alarm to a second control panel for subsequent transmission by the second control panel to the remote cloud server via a remote communication path associated with the second control panel.

20. The non-transitory computer readable medium of claim 19, wherein the instructions cause the one or more processors of the first control panel to:
  determine whether the first alarm is of a first alarm type or a second alarm type;
  when the current operational status of the remote communication path is determined to be off-line, and the first alarm is of the first alarm type, send the first alarm to the second control panel for subsequent transmission by the second control panel to the remote cloud server via the remote communication path associated with the second control panel; and
  when the current operational status of the remote communication path is determined to be off-line, and the first alarm is of the second alarm type, wait to send the first alarm until after the current operational status of the remote communication path is determined to be back on-line, and then send the first alarm to the remote cloud server via the remote communication path.

* * * * *